United States Patent
Kanemaru

(10) Patent No.: US 8,181,475 B2
(45) Date of Patent: May 22, 2012

(54) AUTOMATIC HVAC FAN OPERATION DURING WARM-UP STAGE

(75) Inventor: Junichi Kanemaru, Upper Arlington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 385 days.

(21) Appl. No.: 12/233,086

(22) Filed: Sep. 18, 2008

(65) Prior Publication Data

US 2009/0078781 A1    Mar. 26, 2009

Related U.S. Application Data

(60) Provisional application No. 60/973,927, filed on Sep. 20, 2007.

(51) Int. Cl.
*F25D 17/04* (2006.01)
(52) U.S. Cl. ............... 62/244; 62/180; 62/186; 165/237
(58) Field of Classification Search .................. 62/180, 62/186, 244; 165/237
See application file for complete search history.

(56) References Cited

U.S. PATENT DOCUMENTS

| | | | |
|---|---|---|---|
| 4,382,463 A | 5/1983 | Ikebukuro | |
| 4,538,760 A * | 9/1985 | Kobayashi | 237/2 A |
| 5,588,481 A * | 12/1996 | Dziama et al. | 165/42 |
| 5,670,831 A * | 9/1997 | Georgiades | 307/10.3 |
| 5,878,809 A | 3/1999 | Heinle | |
| 6,672,085 B1 * | 1/2004 | Sangwan et al. | 62/133 |
| 6,827,284 B2 | 12/2004 | Ichishi et al. | |
| 6,971,446 B2 * | 12/2005 | Price et al. | 165/203 |

FOREIGN PATENT DOCUMENTS

JP  60-255523  12/1985
JP  1-273716  11/1989

* cited by examiner

*Primary Examiner* — Cheryl J Tyler
*Assistant Examiner* — Jonathan Bradford
(74) *Attorney, Agent, or Firm* — Mark E. Duell; Rankin Hill & Clark LLP

(57) ABSTRACT

A system and method for automatically operating an HVAC fan for an automotive vehicle is provided where the vehicle includes an occupant detection system and an HVAC system including an HVAC computer. The user sets the heating/cooling temperature of the HVAC system to maximum and then sets the HVAC system to an automatic mode. The occupant detection system determines if there is at least one occupant inside the vehicle. The HVAC computer then automatically operates the HVAC fan based on a response from the occupant detection system.

11 Claims, 5 Drawing Sheets

AUTOMATIC HVAC FAN OPERATION DURING WARM-UP STAGE

BACKGROUND OF THE INVENTION

1. Field of the Invention

The present invention relates to an HVAC system for an automotive vehicle and more specifically, automatically operating the HVAC fan speed during the vehicle's warm-up stage based on occupancy of the vehicle.

2. Description of Related Art

During a vehicle's warm-up stage in a vehicle having a conventional HVAC system, an occupant must manually set both the heating/cooling air temperature and HVAC fan settings to obtain an optimum comfort level inside the vehicle. During the vehicle's warm-up stage, however, the heating/cooling air temperature coming from the heating/cooling vents is initially at an uncomfortably cold temperature. Thus, if the occupant immediately sets the HVAC fan on maximum speed, cold air will blow into the inside of the vehicle, which initially causes the temperature inside the vehicle to decrease. This phenomenon is illustrated in the graph in FIG. 8, which shows the occupant comfort level of the occupant during the vehicle's warm-up stage over time. The graph shows that with the heating/cooling air temperature set at maximum and the HVAC fan set at maximum speed, the occupant comfort level inside the vehicle initially decreases. In other words, the occupant experiences an initial decrease in temperature inside the vehicle before the temperature gradually increases. Therefore, the occupant will preferably wait until the heating/cooling air temperature is warm before turning the HVAC fan to maximum speed. If on the other hand, the occupant is not in the vehicle during the warm-up stage the occupant would prefer to set the HVAC fan on maximum speed so that as the heating/cooling air temperature increases the temperature inside of the vehicle quickly increases. Thus, the occupant has to manually set the HVAC fan to maximum speed before departing the vehicle.

The present invention overcomes the need for the occupant to manually set the HVAC fan speed during the vehicle's warm-up stage by automatically operating the HVAC fan speed based on vehicle occupancy.

SUMMARY OF THE INVENTION

In accordance with one aspect, the present invention overcomes the above mentioned disadvantages by providing a system and method for automatically operating the HVAC fan speed for an automotive vehicle based on vehicle occupancy where the vehicle includes an occupant detection system and an HVAC system including an HVAC computer and an HVAC fan. One occupant sets a heating/cooling temperature of the HVAC system to maximum and sets the HVAC system to an automatic mode. The occupant detection system determines if there is at least one occupant inside the vehicle and operates the HVAC fan automatically with the HVAC computer based on a response from the occupant detection system.

In accordance with another aspect, the occupant detection system includes an occupant detection unit that detects the presence of occupants inside the vehicle.

In accordance with yet another aspect, the occupant detection system measures the speed of the vehicle and determines if the vehicle speed is equal to zero. If the vehicle speed is equal to zero it is concluded that the vehicle is unoccupied. If the speed is not equal to zero, however, it is determined that the vehicle is occupied.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
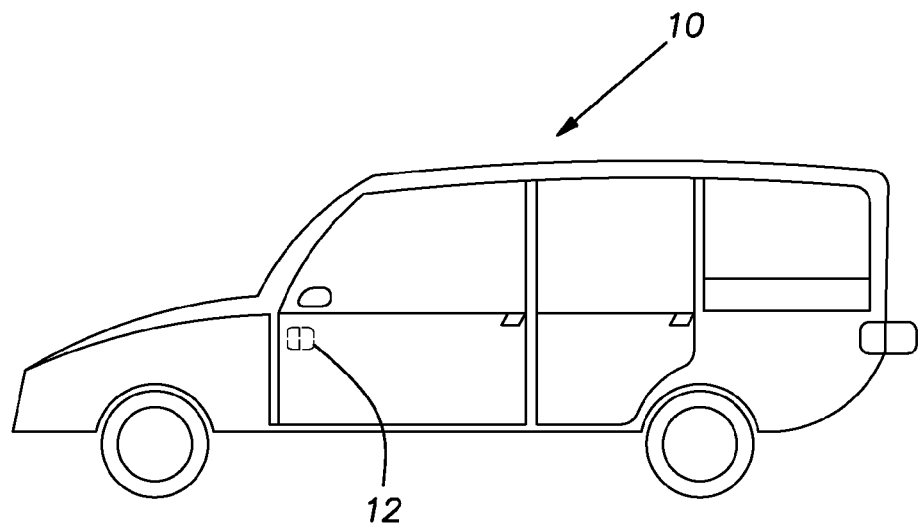
FIG. 1 is a typical vehicle incorporating the present invention.

Referring now to the drawings, FIG. 1 shows a typical vehicle 10 incorporating the automatic fan control system with an occupant detection system of the present invention. The automatic fan control system is incorporated into the vehicle's existing computer based heating, ventilation and air conditioning (HVAC) system. The automatic fan control system works in conjunction with the vehicle's HVAC system to provide an optimum occupant comfort level for occupants inside the vehicle during the warm-up stage of the vehicle's heating system.

The HVAC system may include several modes of operation including an automatic mode, whereby the automatic fan control system is operational when the HVAC system is in the automatic mode. For example, after the user starts the vehicle the user sets the HVAC system to the automatic mode and sets heating/cooling air temperature (hereafter "air mix temperature") to maximum. The HVAC computer then automatically operates the HVAC fan based on responses from the occupant detection system to thereby provide the optimum occupant comfort level to the occupants inside the vehicle. The HVAC fan is automatically operated in accordance with a program stored in the HVAC computer. It should be noted that the HVAC system is of the type typically known in the art with the exception of the automatic fan control system. Thus, operation of only the automatic fan control system will be described herein.

Figure 2:
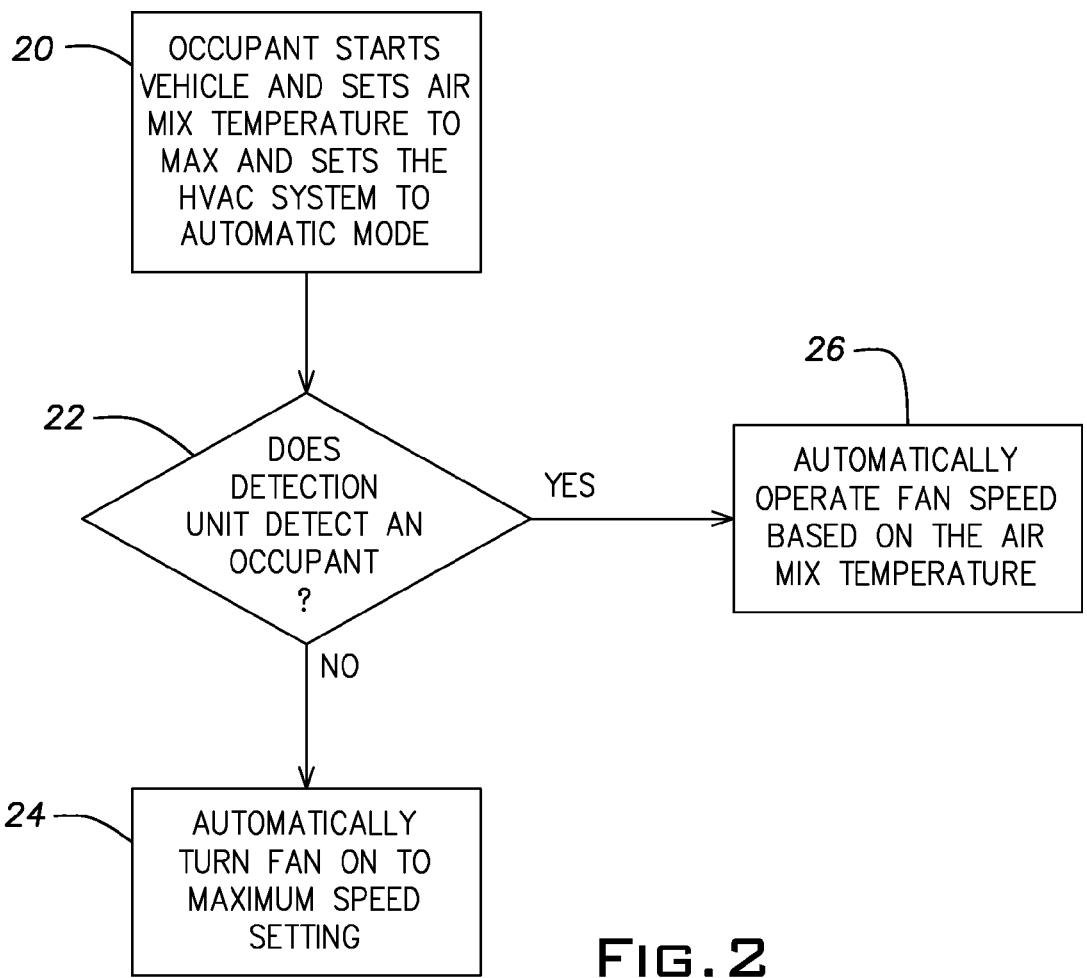
FIG. 2 is a flow chart illustrating a first embodiment of an HVAC system during warm-up stage in accordance with the present invention.
Figure 3:
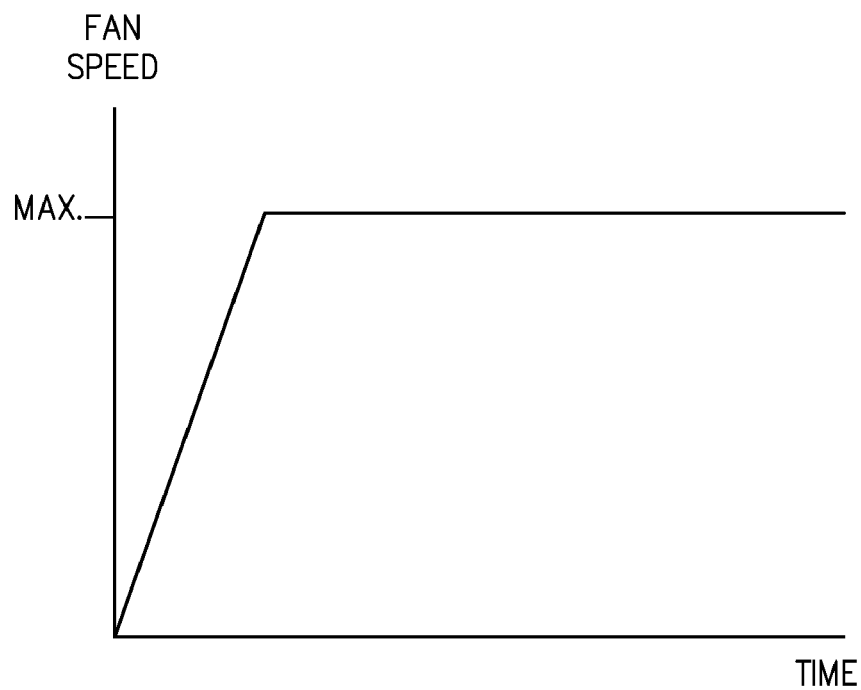
FIG. 3 is a graph illustrating the operation of a vehicle HVAC fan in accordance with the first embodiment of the present invention.
Figure 4:
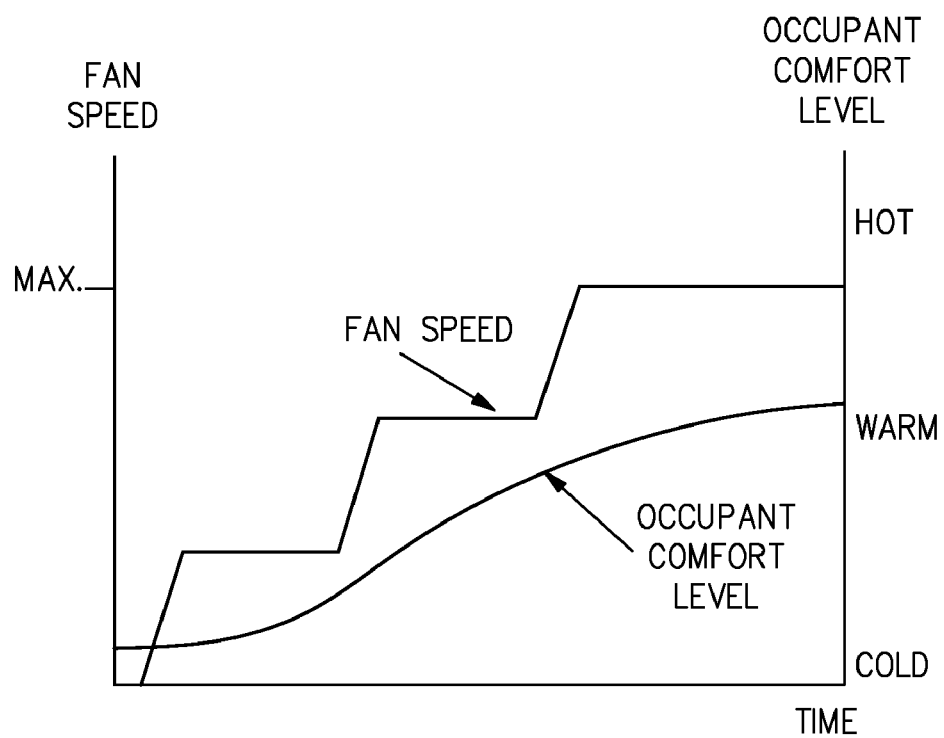
FIG. 4 is a graph illustrating the HVAC system warm-up stage in accordance with the first embodiment of the present invention.

Referring to FIGS. 2-4, operation of a first embodiment of the automatic fan control system is illustrated in accordance with the present invention. In the first embodiment, the HVAC computer automatically controls the operation of the HVAC fan during the vehicle's warm-up stage based on a response from the occupant detection system. The occupant detection system in the first embodiment is an occupant detection unit 12 of the type commonly known in the art. For example, the occupant detection unit 12 may be any type of occupant detection unit known in the art such as, for example, but not limited to an infrared sensor, a seat weight sensor, a seat belt activation sensor, etc. Thus, based on vehicle occupancy, the HVAC computer will either automatically turn the HVAC fan on maximum speed (FIG. 3) if there are no occupants in the vehicle 10 or automatically operate the HVAC fan in a controlled manner (FIG. 4) based on the air mix temperature if there are occupants present in the vehicle 10.

It should be clarified that the warm-up stage of the vehicle's heating system occurs during the initial start-up of the vehicle. When the vehicle has been cold soaking (i.e. when the vehicle is subjected to an uncomfortably cold temperature) for an extended period of time the initial air mix temperature coming from the HVAC vents is also at an uncomfortably cold temperature. Thus, the warm-up stage is the period when the air mix temperature heats up to a comfortable temperature and therefore, warms the inside of the vehicle to a comfortable temperature.

Referring to FIG. 2, a flow chart depicting the first embodiment of the operation of the HVAC fan during the warm-up stage of the vehicle's heating system is illustrated. In step 20 the occupant upon starting the vehicle's engine sets the air mix temperature to maximum and the HVAC system to the automatic mode. In step 22 the occupant detection unit 12 determines if there is at least one occupant inside the vehicle 10. If the determination in step 22 is no then in step 24 the HVAC computer automatically turns the HVAC fan to the maximum speed setting, as illustrated in FIG. 3. In this case, even though there will be an initial decrease in temperature inside the vehicle 10, as explained above, as the air mix temperature increases the temperature inside the vehicle 10 will increase without the user having to re-enter the vehicle 10 to adjust the HVAC fan speed. Thus, the inside of the vehicle 10 will warm quickly before the occupant(s) enter the vehicle 10. If the determination in step 22 is yes then in step 26 the HVAC computer automatically operates the HVAC fan speed based on the air mix temperature, see FIG. 4. FIG. 4 is a graph that shows how both the HVAC fan speed and the temperature inside the vehicle 10, represented by the occupant comfort level curve, gradually increase over time as the air mix temperature increases. In addition, the occupant comfort level curve in FIG. 4 illustrates that by automatically operating the HVAC fan speed based on the air mix temperature the initial decrease in temperature inside the vehicle 10, as disclosed in the prior art above, is avoided. Thus, gradually increasing the HVAC fan speed prevents the initial decrease in temperature inside the vehicle and also provides an optimum comfort level for the vehicle occupants during the vehicle's warm-up stage.

Figure 5:
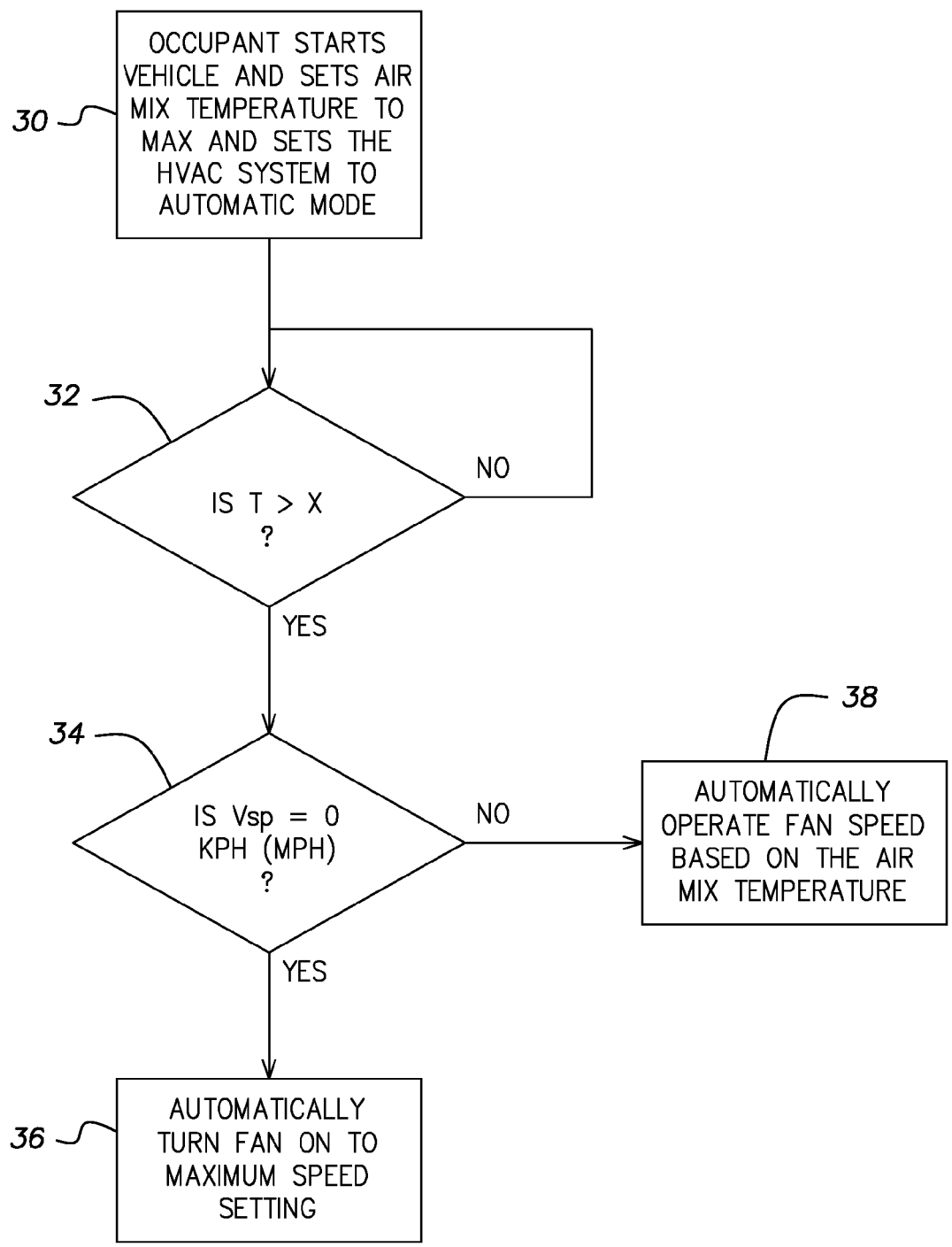
FIG. 5 is a flow chart illustrating a second embodiment of the HVAC system during warm-up stage in accordance with the present invention.
Figure 6:
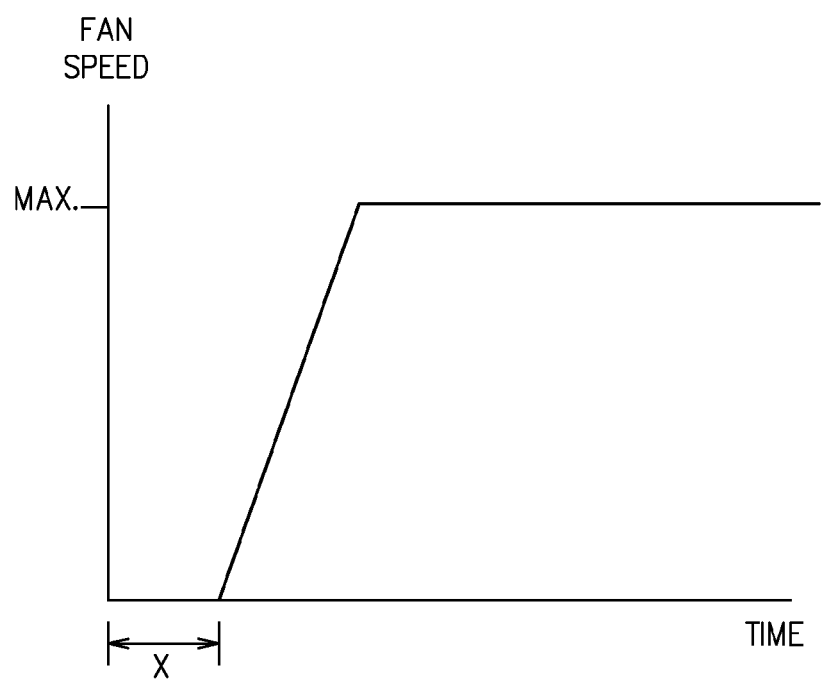
FIG. 6 is a graph illustrating the operation of a vehicle HVAC fan in accordance with the second embodiment of the present invention.
Figure 7:
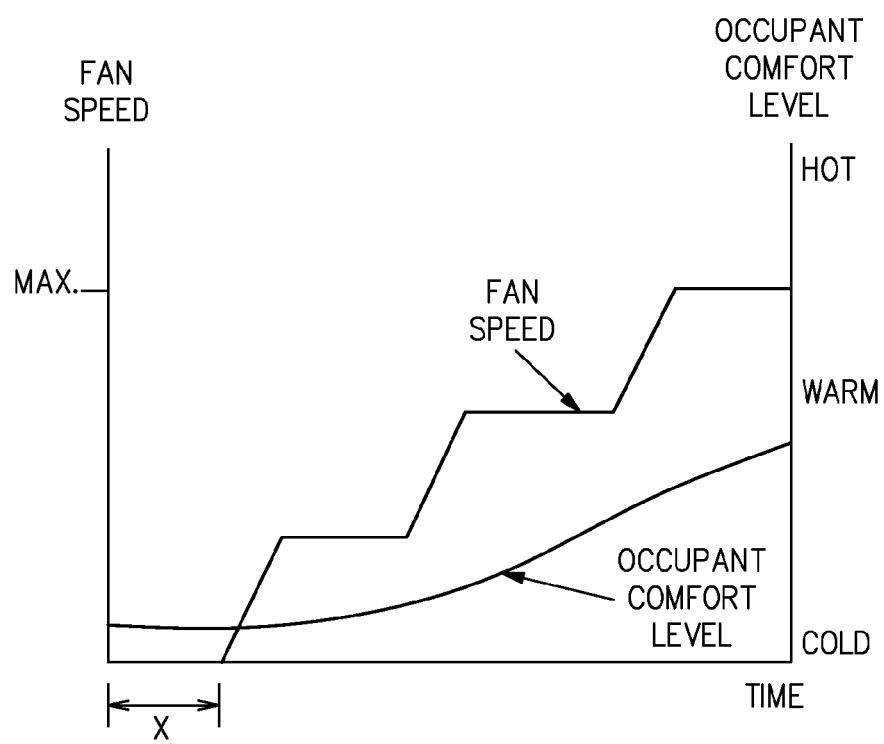
FIG. 7 is a graph illustrating the HVAC system warm-up stage in accordance with the second embodiment of the present invention.
Figure 8:
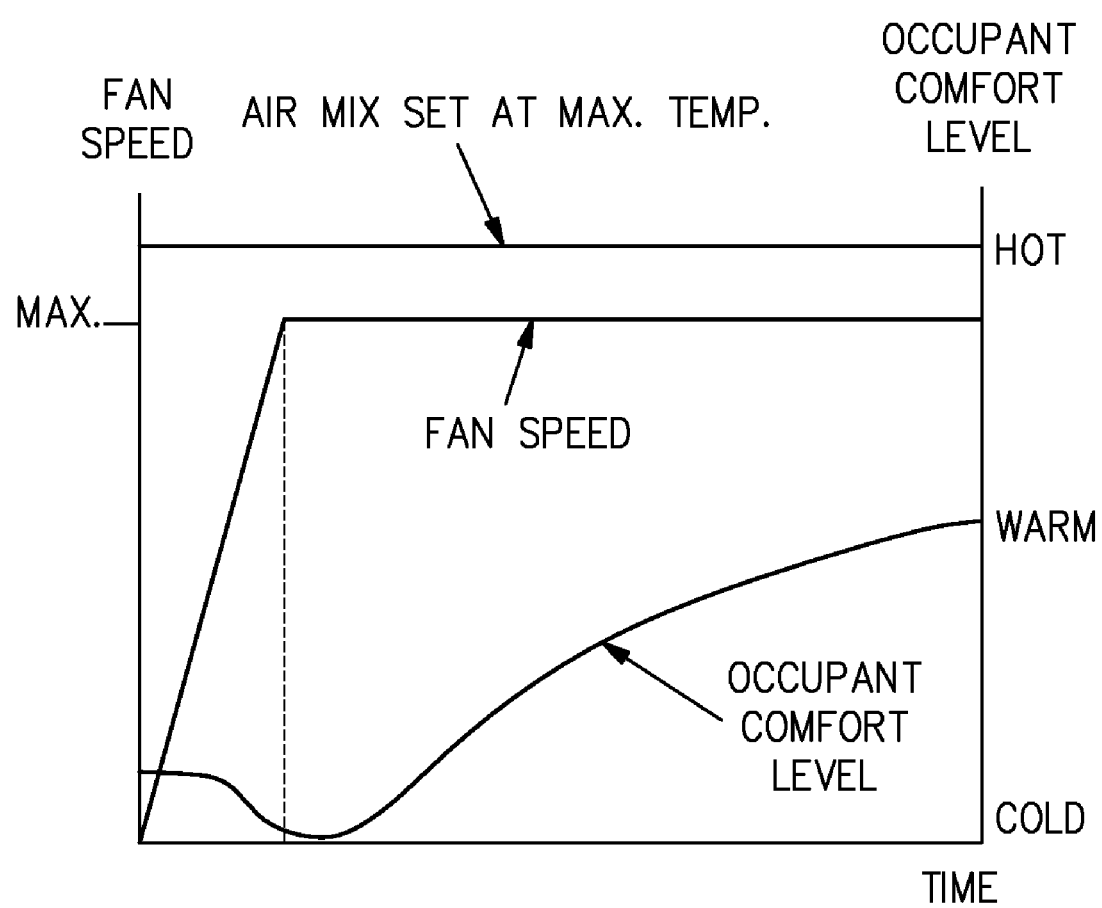
FIG. 8 is a graph illustrating the conventional HVAC warm-up stage.

Referring to FIGS. 5-7, operation of a second embodiment of the automatic fan control system is illustrated in accordance with the present invention. In the second embodiment, just like the first embodiment, the HVAC computer automatically controls the operation of the HVAC fan during the vehicle's warm-up stage based on a response from the occupant detection system. In the second embodiment the occupant detection system detects occupants based on the motion or non-motion of the vehicle 10. In other words, if the vehicle 10 is not in motion indicates that there are no occupants in the vehicle 10. Conversely, if the vehicle 10 is in motion indicates that there are occupants in the vehicle 10. Thus, the HVAC computer automatically operates the HVAC fan during the vehicle's warm-up stage by detecting occupants based on the motion of the vehicle 10. Therefore, the HVAC computer will either automatically turn the HVAC fan on maximum speed (FIG. 6) if the vehicle 10 is not in motion, indicating that there are no occupants in the vehicle 10, or automatically operate the HVAC fan in a controlled manner (FIG. 7) based on the air mix temperature if the vehicle 10 is in motion, indicating that there are occupants in the vehicle 10.

Referring to FIG. 5, a flow chart depicting the second embodiment of the operation of the HVAC fan during the warm-up stage of the vehicle's heating system is illustrated. In step 30 the occupant upon starting the vehicle's engine sets the air mix temperature to maximum and the HVAC system to the automatic mode. In step 32 it is determined if a predetermined period of time (X), measured either in seconds or minutes, has elapsed since the user started the vehicle 10. The predetermined period of time (X) is a time delay to allow the vehicle's engine to run for a short period of time and to allow the vehicle occupants to settle into the vehicle 10 before operating the vehicle 10, see FIGS. 6 and 7. If the determination in step 32 is no then the program loops back to step 32 and determines once again if predetermined period of time (X) has elapsed since the user started the vehicle 10. Once it has been determined that the predetermined period of time (X) has elapsed since the operator started the vehicle 10 the process continues to step 34. In step 34 it is determined from the vehicle's speedometer if the speed of the vehicle 10 is equal to zero kph (mph). If the determination in step 34 is yes then in step 36 the HVAC computer automatically turns the HVAC fan to the maximum speed setting, as illustrated in FIG. 6. As mentioned above, because the speed of the vehicle is equal to zero kph (mph) and the vehicle is not in motion there are potentially no occupants in the vehicle 10. In this case, even though there will be an initial decrease in temperature inside the vehicle 10, as explained above, as the air mix temperature increases the temperature inside the vehicle 10 will increase without the user having to re-enter the vehicle 10 to adjust the HVAC fan speed. Thus, the inside of the vehicle 10 will warm quickly before the occupant(s) enter the vehicle 10. If the determination at step 34 is no then in step 38 the HVAC computer automatically operates the HVAC fan speed based on the temperature of the air mix, see FIG. 7. FIG. 7 is a graph that shows how both the HVAC fan speed and the temperature inside the vehicle 10, represented by the occupant comfort level curve, gradually increase over time as the air mix temperature increases. In addition, the occupant comfort level curve in FIG. 7 illustrates that by automatically operating the HVAC fan speed based on the air mix temperature the initial decrease in temperature inside the vehicle 10, as disclosed in the prior art above, is avoided. Thus, gradually increasing the HVAC fan speed prevents the initial decrease in temperature inside the vehicle and also provides an optimum comfort level for the vehicle occupants during the vehicle's warm-up stage.

It should be noted, that in both embodiments disclosed above that the HVAC computer will continue to automatically operate the HVAC fan speed to maintain an optimum occupant comfort level inside the vehicle 10 as long as the HVAC system is in the automatic mode. The user, however, can disengage the automatic mode and, thus, manually operate the air mix temperature and the HVAC fan speed settings.

The present invention discloses two occupant detection embodiments for automatically operating the HVAC fan during the warm-up stage of an automotive vehicle. The first embodiment uses a detection unit such as an infrared sensor, seat weight sensor, seat belt activation sensor, etc. to determine if the vehicle is occupied. The second embodiment determines if the vehicle is occupied based on the motion or non-motion of the vehicle. It should be noted, however, that the present invention is not limited to the detection systems disclosed above. Rather, any type of detection or sensing system to automatically operate the HVAC fan during the warm-up stage to provide optimum occupant comfort can be utilized in the present invention.

While specific embodiments of the invention have been described and illustrated, it is to be understood that these embodiments are provided by way of example only and that the invention is not to be construed as being limited but only by proper scope of the following claims.

What is claimed is:

1. A method for automatically controlling an inside temperature of an automotive vehicle during the automotive vehicle's warm-up stage comprising:
   providing a vehicle having an occupant detection system and an HVAC system including an HVAC computer and an HVAC fan;
   determining if a heating/cooling temperature of the HVAC system is set to maximum;
   determining if a mode of the HVAC system is set to an automatic mode;
   continuously determining if there is at least one occupant inside the vehicle with the occupant detection system, and
   operating the HVAC fan automatically with the HVAC computer based on each of the determinations of whether the heating/cooling temperature is set to the maximum, whether the mode is set to the automatic mode and whether at least one occupant is detected inside the vehicle, wherein when it is determined that the heating/cooling temperature is set to the maximum and it is determined that the mode is set to the automatic mode, operating the HVAC fan automatically includes:
     automatically increasing the HVAC fan speed in a controlled manner based on the heating/cooling temperature of the HVAC system when it is determined that at least one occupant is inside the vehicle, and
     automatically setting the HVAC fan on maximum speed when it is determined that there is not at least one occupant inside the vehicle.

2. The method of claim 1, wherein the occupant detection system includes an occupant detection unit and wherein determining if there is at least one occupant inside the vehicle comprises detecting the presence of the at least one occupant with the occupant detection unit.

3. The method of claim 2, wherein if the occupant detection unit detects the presence of the at least one occupant, the method further comprises:
   increasing the heating/cooling temperature of the HVAC system; and
   increasing the inside temperature of the vehicle based on the heating/cooling temperature of the HVAC system.

4. The method of claim 1, wherein determining if there is at least one occupant inside the vehicle further comprises:
   determining if a predetermined period of time has elapsed;
   determining if the vehicle is in motion;
   determining that the vehicle is unoccupied if the vehicle is not in motion, and
   determining that the vehicle is occupied if the vehicle is in motion.

5. The method of claim 4, wherein if it is determined that the vehicle is in motion, the method further comprises:
   increasing the heating/cooling temperature of the HVAC system; and
   increasing the inside temperature of the vehicle based on the heating/cooling temperature of the HVAC system.

6. The method of claim 5, wherein determining if the vehicle is in motion comprises:
   measuring the speed of the vehicle, and
   determining if the speed of the vehicle is equal to zero.

7. A method for automatically operating an HVAC fan for an automotive vehicle when a heating/cooling temperature is set to maximum and an HVAC mode is set to an automatic mode, comprising:
   setting the heating/cooling temperature of the HVAC system to maximum;
   setting the HVAC system to the automatic mode; and
   continuously determining if the vehicle is occupied,
   wherein if it is determined that there are no occupants in the vehicle, the heating/cooling temperature is set to the maximum and the HVAC system is set to the automatic mode, the HVAC computer automatically sets the speed of the HVAC fan on maximum, and
   wherein if it is determined that there are occupants in the vehicle, the heating/cooling temperature is set to the maximum and the HVAC system is set to the automatic mode, the HVAC computer automatically increases the speed of the HVAC fan in a controlled manner.

8. The method of claim 7, wherein the vehicle further includes an occupant detection unit and wherein determining if the vehicle is occupied comprises detecting the presence of at least one occupant in the vehicle with the occupant detection unit.

9. The method of claim 8, wherein if it is determined that there are occupants in the vehicle, the method further comprising:
   increasing the heating/cooling temperature of the HVAC system; and
   increasing an inside temperature of the vehicle based on the heating/cooling temperature of the HVAC system.

10. A method for automatically operating an HVAC fan for an automotive vehicle comprising:
    providing a vehicle having an HVAC system including an HVAC computer;
    setting a heating/cooling temperature of the HVAC system to maximum;
    setting the HVAC system to an automatic mode;
    determining if a predetermined period of time has elapsed;
    after it is determined that the predetermined period of time has elapsed, determining if the vehicle is occupied by measuring a speed of the vehicle and determining that the vehicle is unoccupied if the speed of the vehicle is equal to zero, and
    operating the HVAC fan automatically with the HVAC computer based on the speed of the vehicle, wherein if it is determined that the vehicle is unoccupied the method further includes setting the HVAC fan on maximum speed automatically with the HVAC computer.

11. The method of claim 10, wherein if the speed of the vehicle is not equal to zero it is determined that the vehicle is occupied and the method further comprises:
    increasing the heating/cooling temperature of the HVAC system;
    increasing the HVAC fan speed in a controlled manner automatically with the HVAC computer, and
    increasing the inside temperature of the vehicle gradually based on the heating/cooling temperature of the HVAC system.

* * * * *